United States Patent [19]
Johnson et al.

[11] Patent Number: 4,715,678
[45] Date of Patent: Dec. 29, 1987

[54] OPTICAL FIBRE CABLE

[75] Inventors: Oliver S. Johnson, Kent; Robert J. W. Powell, Middlesex, both of England

[73] Assignee: Telephone Cables Limited, England

[21] Appl. No.: 669,580

[22] Filed: Nov. 8, 1984

[30] Foreign Application Priority Data

Nov. 16, 1983 [GB] United Kingdom ............. 8330621

[51] Int. Cl.⁴ .............................................. G02B 6/44
[52] U.S. Cl. ................................ 350/96.23; 350/96.34
[58] Field of Search ............. 350/96.23, 96.29, 96.30, 350/96.34

[56] References Cited

U.S. PATENT DOCUMENTS

| 3,868,170 | 2/1975 | DeLuca | 350/96.34 |
| 4,118,211 | 10/1978 | Au Coin et al. | 65/3 R |
| 4,473,599 | 9/1984 | Elion | 427/163 |
| 4,504,113 | 3/1985 | Baak | 350/96.34 X |
| 4,525,026 | 6/1985 | Elion | 350/96.23 |

FOREIGN PATENT DOCUMENTS

| 1079512 | 6/1980 | Canada . |
| 0114092 | 7/1984 | European Pat. Off. . |
| 2211042 | 9/1973 | Fed. Rep. of Germany . |
| 2755568 | 6/1979 | Fed. Rep. of Germany . |
| 57-205703 | 12/1982 | Japan . |
| WO8201543 | 4/1982 | PCT Int'l Appl. . |
| WO8201365 | 4/1982 | PCT Int'l Appl. . |
| 2032678 | 5/1980 | United Kingdom . |
| 2065633 | 7/1981 | United Kingdom . |
| 2087589 | 5/1982 | United Kingdom . |
| 2166886 | 5/1986 | United Kingdom ............. 350/96.23 |

OTHER PUBLICATIONS

Boscher, L'Onde Electrique, vol. 65, No. 4, Jul.-Aug. 1985, "Câbles et composants passifs pour liaisons monomodes", pp. 59-69.

Primary Examiner—James W. Davie
Assistant Examiner—Frank Gonzáles
Attorney, Agent, or Firm—Kirschstein, Kirschstein, Ottinger & Israel

[57] ABSTRACT

An optical fibre cable contains a quantity of hydrogen trapping material distributed along it for example within each channel containing one or more optical fibres.

10 Claims, 6 Drawing Figures

OPTICAL FIBRE CABLE

BACKGROUND OF THE INVENTION

1. Field of the Invention

This invention relates to optical fibre cables, that is to say cables incorporating one or more optical fibres, and also to optical fibres for use therein.

2. Description of Related Art

One problem which has been experienced with optical fibre cables is a gradual increase in transmission losses for certain wavelengths with age.

It has been found that this is caused, at least in part, by the gradual absorption of hydrogen by the fibres, even where they are provided with protective coatings of synthetic plastics material, the hydrogen being initially present within the cable or being gradually evolved within the cable during its life. An object of the invention is to provide a way of alleviating this problem.

SUMMARY OF THE INVENTION

According to one aspect of the invention an optical fibre cable contains a quantity of a hydrogen trapping material distributed along it.

The expression "hydrogen trapping material" means a material capable of collecting free hydrogen, either by absorpotion or by chemical or other action, thereby reducing the amount of hydrogen available within the cable which could have a detrimental effect on the optical fibre or fibres.

The hydrogen trapping material must, of course, be suitably located within the cable so as to be active on hydrogen surrounding the fibre or fibres, and where the cable has a plurality of channels, each containing one or more optical fibres, a quantity of said hydrogen trapping material may, for example, be contained within each said channel.

The hydrogen trapping material, which may be mixed with or contained within one or more other materials which do not detract significantly from its hydrogen collecting properties, must of course, be one which does not itself have any detrimental effect on the cable construction, and may for example consist of finely divided manganese dioxide, although other materials for example absorbants such as titanium, zirconium or palladium, or possibly alloys thereof, could alternatively be employed.

Where one of the latter materials is used it may be in the form of a coating on a finely divided carrier material. For example palladised carbon, that is to say charcoal particles coated with palladium, is especially suitable.

Where manganese dioxide is used as the hydrogen trapping material, this is preferably an activated form, that is to say one in which its action is enhanced by the inclusion of an appropriate catalyst such as coppper, certain copper salts, cobalt and silver either individually or in combination.

The hydrogen trapping properties of some materials, such as manganese dioxide, tend to be increased at higher temperatures, and the cable may in some cases incorporate means for heating the material either continuously or periodically. This may be achieved by the incorporation of an electric heating element within the cable. Thus the cable may contain a stranded electric conductor having the interstices filled with manganese dioxide paste or other appropriate material and contained within a surrounding layer of hydrogen permeable insulation, an electric current being passed through the conductor at appropriate times and for appropriate periods to cause the hydrogen trapping material to react with hydrogen which is present.

The reaction of some hydrogen trapping materials with hydrogen produces water, and where this would react with components of the cable to give rise to the generation of more hydrogen, or otherwise have a detrimental effect on the cable, means must, of course, be provided to prevent this occurring, as by the provision of a suitable water-absorbing or -blocking substance such as a suitable molecular sieve material. This can be in a finely divided form and mixed with the hydrogen trapping material.

Where the fibre or fibres is/are loosely accommodated in a respective channel in the cable, the hydrogen trapping material could be contained in the space between the fibre or fibres and the wall of the channel and, in the case where the channel contains a plurality of fibres, in the interstices between the fibres.

Conveniently, in such a case, the material may be contained within a paste- or jelly-like substance permeable to hydrogen, such as petroleum jelly, silica gel or other material which permits a degree of movement of the fibre or fibres within the respective channel as the cable is bent or flexed, in order to prevent any undue strain being placed on the fibres. For this reason also the fibres conveniently follow a path which, between the ends of such a cable, is greater than the length of the cable.

In an alternative embodiment the hydrgen trapping material may be provided by or contained within a layer on the wall of a channel of the cable which accommodates the fibre or fibres.

The wall of the channel may be provided by a metal strip folded or wrapped around the fibre or fibres and internally coated with such a layer, or by a hollow metal tube into which the fibre or fibres is/are subsequently introduced.

Alternatively the wall of the channel may be of plastics material, the material conveniently being formed by extrusion over the fibre or fibres, and coated in any convenient manner, although the hydrogen trapping material may be alternatively or additionally contained within the plastics material itself, or in some cases in a completely separate tube, having hydrogen permeable walls or on the inner surface of a surrounding sheath.

In another form of the invention the hydrogen trapping material may be incorporated in a layer applied to one or more fibres; for example it may be in the form of a powder contained within a layer of plastics material, such as a silicone resin applied to the or each side fibre; in such a case an initial layer of plastics material is preferably applied to the surface of the fibre before the application of the hydrogen trappig layer, to protect the surface of the fibre against possible scratching or scoring by the powdered material. The hydrogen trapping layer may be coated, in turn, with a capping layer, also conveniently of plastics material.

Alternatively, as the mobility of hydrogen is high the trapping material may be distributed in any other convenient locations throughout the length of the cable.

If a catalystic hydrogen absorber is used, that is to say one which results in hydrogen combining with free oxygen, the quantity of oxygen present capable of reacting with the hydrogen should be sufficient to combine with all the hydrogen expected throughout the life of the cable.

Thus if the material is contained within a separate tube, it should either contain sufficient oxygen ab initio, or the tube should be of a material no less than half as permeable to oxygen as to hydrogen with sufficient free oxygen available in other parts of the cable.

BRIEF DESCRIPTION OF THE DRAWINGS

A number of different embodiments of the invention will now be described by way of example with reference to FIGS. 1 to 6 of the accompanying schematic drawings, in which.

DETAILED DESCRIPTION OF THE PREFERRED EMBODIMENTS

Figure 1:
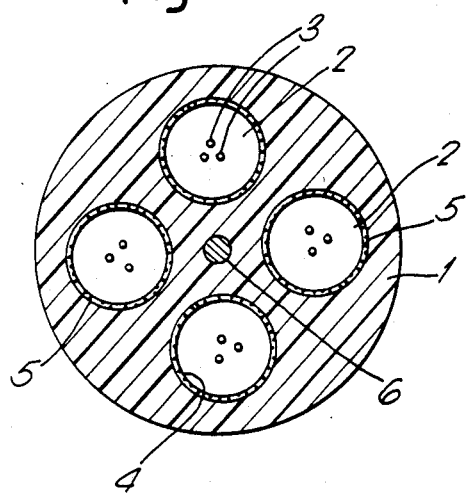
FIGS. 1 and 2 represent transverse sections through two different cables in accordance with the invention.

The optical fibre cable illustrated in FIG. 1 comprises a sheath 1 of extruded plastics material having a plurality of channels 2 in which there are located a number of optical fibres as at 3, the fibres being a loose fit within the respective channels 2.

The wall of each channel 2 is coated with a layer 4 of silicone resin in which is distributed powdered manganese dioxide 5, which layer is conveniently applied during the extrusion process, the manganese dioxide serving to combine with free hydrogen within the cable, so reducing its effect on the optical fibre or fibres, and prolonging the useful life of the cable. The extruded sheath 1 may also contain one or more strength members, for example, as illustrated at 6.

Figure 2:
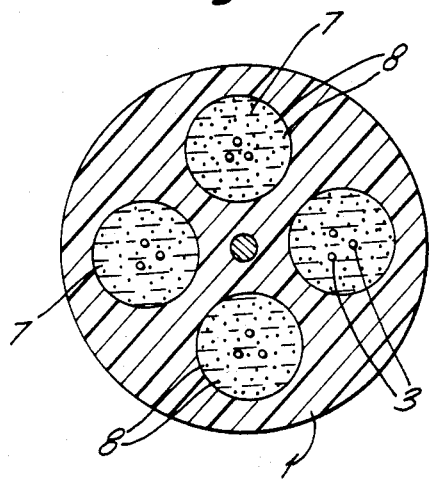

Alternatively, as shown in FIG. 2, instead of being coated with such a layer, each of the channels may contain petroleum jelly, or other jelly-like substance, as at 7 having powdered manganese dioxide 5 within it, and substantially filling the space between the fibres 3 and the wall of the channel. In a further embodiment, not illustrated, the manganese dioxide may alternatively be contained within one or more separate tubes, for example of woven glass fibre, silicone rubber, or other material permeable to hydrogen, located within a respective one or more of the channels 2.

Figure 3:
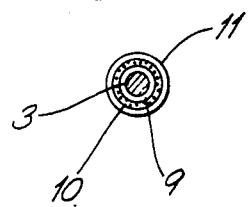
FIG. 3 represents a section through a fibre of another form of cable.

In yet a further embodiment the or each said fibre 3, one of which is shown greatly enlarged in FIG. 3, has applied to it, after manufacture, but before incorporation into the cable, an initial protective layer 9 silicone resin followed by a second layer 10 of silicone resin containing powdered manganese dioxide and a third capping layer of silicone resin 11. The layers may be applied by passing the fibre through baths of liquid silicone resin, the second containing manganese dioxide powder in suspension, followed by curing. This embodiment may be used, for example, where the fibre or fibres are tightly enclosed in a cable sheath.

In place of manganese dioxide other materials may be used to trap the free hydrogen, either by oxidation directly or by means of catalytic action resulting from the presence of a suitably distributed catalyst, or alternatively by absorption.

Thus in a further embodiment of the invention, one or more fibres 3 are loosely contained within a plurality of tubes 13 surrounded by an outer sheath 14. The tubes 13 may be of plastics material or alternatively of metal, and are shown coated internally with a layer 15 of hydrogen trapping material. Where the tubes 13 are of plastics or other material which is permeable to hydrogen, the hydrogen trapping material may be applied to the exterior surfaces of the tubes or on the internal surface of the sheath 14.

Figure 4:
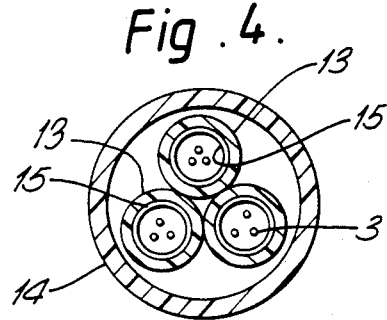
FIGS. 4 and 5 represent transverse sections through two further forms of cable.
Figure 5:
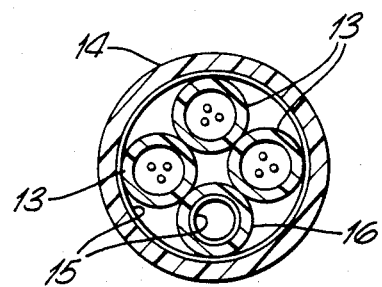

In a modification of the embodiment illustrated in FIG. 4 utilizing tubes of hydrogen permeable material the hydrogen trapping material may be contained as at 15 in FIG. 5, within a separate tube 16 within the sheath 14, i.e one which does not contain optical fibres, or alternatively or additionally on the inner surface of the sheath 14.

Figure 6:
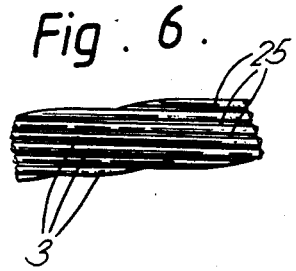
FIG. 6 shows a side view of some optical fibres in yet another embodiment of the invention.

In a cable having a sheath provided with channels 2, as in FIGS. 1 and 2, or one containing separate tubes, as in FIG. 4, the fibres 3 may be stranded together, and in some cases the hydrogen trapping material in such a case may be contained within the interstices between the fibres as at 25 in FIG. 6.

The invention may be applied to various other types of optical fibre cable constructions, the most suitable method of introducing the hydrogen trapping material being readily chosen to suit the particular form of cable, and the material employed.

We claim:

1. An optical fibre cable comprising: a sheath having at least one channel extending along the sheath, at least one optical fibre contained within said at least one channel and, means located within and distributed along the sheath, for catalyzing the oxidation of hydrogen within the cable to water, said means including a quantity of hydrogen trapping material together with at least one of a waterblocking and a water-absorbing substance.

2. An optical fibre cable according to claim 1 wherein the hydrogen trapping material comprises one of activated manganese dioxide and finely divided palladium.

3. An optical fibre cable according to claim 1 in which said at least one of the water-absorbing and water-blocking substance comprises a molecular sieve material.

4. An optical fibre cable according to claim 1 in which said at least one optical fibre is loosely accommodated in said at least one chanel, and wherein the hydrogen trapping material is contained in a space between said at least one fibre and a wall of said at least one channel.

5. An optical fibre cable according to claim 1 wherein the hydrogen trapping material is contained within a layer on a wall of said at least one channel accommodating said at least one optical fibre.

6. An optical fibre cable according to claim 1 wherein the hydrogen trapping material is incorporated in a layer applied to said at least one said optical fibre.

7. An optical fibre cable comprising: a sheath having a plurality of channels extending along the sheath, each channel containing at least one optical fibre, and means located within and distributed along the sheath, for catalyzing the oxidation of hydrogen within the cable to water, said means including a quantity of hydrogen trapping material together with at least one of a water-blocking and a water-absorbing substance contained within at least one of said channels.

8. An optical fibre cable comprising: a sheath having at least one channel extending along the sheath, at least one optical fibre contained within said at least one channel, and means located within and distributed along the sheath, for catalyzing the oxidation of hydrogen within the cable to water, said means including a quantity of hydrogen trapping material constituted of palladised carbon together with at least one of a water-blocking and a water-absorbing substance.

9. An optical fibre cable comprising: a sheath having at least one channel extending along the sheath, a plurality of optical fibres stranded together and located within said at least one channel, and means located within and distributed along the sheath, for catalyzing the oxidation of hydrogen within the cable to water, said means including a quantity of hydrogen trapping material contained in interstices between the optical fibres together with at least one of a waterblocking and a water-absorbing substance.

10. An optical fibre cable comprising: a sheath having at least one channel extending along the sheath, at least one optical fibre contained within said at least one channel, means located within and distributed along the sheath, for catalyzing the oxidation of hydrogen within the cable to water, said means including a quantity of hydrogen trapping material together with at least one of a water-blocking and a water-absorbing substance, and one of a paste- and jelly-like substance permeable to hydrogen and containing the hydrogen trapping material therein being accommodated within said at least one channel.

* * * * *